Patented June 1, 1954

2,680,059

UNITED STATES PATENT OFFICE 2,680,059

METHOD FOR STABILIZING ALKALI METAL AND ALKALINE EARTH METAL ALUMINUM HYDRIDES

Robert W. Bragdon, Marblehead, Mass., assignor to Metal Hydrides Incorporated, Beverly, Mass., a corporation of Massachusetts No Drawing. Original application August 3, 1951, Serial No. 240,278, now Patent No. 2,656,243, dated October 20, 1953. Divided and this application April 7, 1953, Serial No. 347,418

5 Claims. (Cl. 23—14)

This invention relates to the production of alkali metal and alkaline earth metal aluminum hydrides and, more particularly, to the stabilization of these hydrides.

The alkali metal and alkaline earth metal aluminum hydrides may be prepared by reacting an aluminum halide, such as aluminum chloride, in solution in diethyl ether with an alkali metal hydride, such as lithium hydride, sodium hydride, etc., or an alkaline earth metal hydride, such as calcium hydride. One of the most important of these hydrides is lithium aluminum hydride having the formula $LiAlH_4$. If the reagents are mixed in the proportions of the following equation, or if an excess of lithium hydride is used, the reaction proceeds as follows:

(1)   $4LiH + AlCl_3 \rightarrow LiAlH_4 + 3LiCl$ 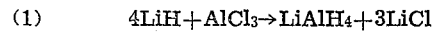

The lithium aluminum hydride is soluble in diethyl ether and remains in solution while the lithium chloride is precipitated and may be removed by filtration. The filtrate may be evaporated to recover lithium aluminum hydride as a white powder having the formula $LiAlH_4$.

However, if the reagents are mixed in the proportions of the following equation, the reaction proceeds as follows:

(2)   $3LiH + AlCl_3 \rightarrow 3LiCl + AlH_3$ 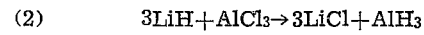

The lithium chloride may be removed by filtration. It is impossible to remove all the diethyl ether from the filtrate by evaporation without decomposing the hydride. If the ether is removed at room temperature without extensive evacuation the solid product is aluminum hydride diethyl etherate and has a composition approximating the formula $2AlH_3 \cdot O(C_2H_5)_2$.

The diethyl ether solution of lithium aluminum hydride produced as represented by Equation 1 above as well as a more concentrated solution obtained by the partial removal of the ether decompose during storage with evolution of a gas and the formation of a precipitate. This creates a serious problem in the storage and shipment of this product due to the gradual build up of gas pressure within the storage and shipping containers. The formation of the precipitate also is objectionable. The white lithium aluminum hydride powder obtained as previously described also is unstable and gradually turns gray during storage.

The cause of this unstableness is not definitely known. It is known, however, that the product produced by the reaction represented by Equation 1 above does contain a small amount of aluminum hydride which is not combined with lithium and may be formed as the result of a side reaction as represented by Equation 2 above and be present as the diethyl etherate. The amount of this impurity varies between about one half to about two per cent by weight with different runs. A small amount of one or more other side reaction products may be present which react with the aluminum hydride during storage to cause the unstableness previously mentioned.

I have discovered that alkali metal aluminum hydrides or alkaline earth metal aluminum hydrides which have been produced by reacting the corresponding alkali metal hydride or alkaline earth metal hydride with an aluminum halide in solution in diethyl ether can be effectively stabilized for storage by bringing the product in contact with certain basic organic compounds having a basic strength greater than that of diethyl ether. Illustrative examples of such stabilizing agents are 1,4-dioxane, the lower alkyl dialkyl cellosolves, such as dimethyl cellosolve and diethyl cellosolve, and tertiary amines, such as trimethylamine, triethylamine, etc.

In the practice of the invention, the stabilizing agent may be added to the solid dry double hydride, such as lithium aluminum hydride, and the mixture placed in a closed container. The stabilizing agent selected in such case should be volatile so that its vapor can react preferentially with the double hydride. The stabilizing agent may be added to the diethyl ether solution of the double hydride before the solution is evaporated either to dryness or merely to concentrate the solution. Some stabilizing agents, such as trimethylamine, form a volatile addition compound with aluminum hydride which can be removed during a vacuum drying operation. In general, an amount of stabilizing agent between about one to six per cent by weight of the double hydride is satisfactory. A small excess is not harmful. After the above treatment, the product may be placed in a closed container for storage or shipment without danger.

This application is a division of my copending application Serial No. 240,278, filed August 3, 1951, now Patent No. 2,656,243, dated October 10, 1953.

I claim:

1. The method for producing and stabilizing a product selected from the group consisting of an alkali metal aluminum hydride and an alkaline earth metal aluminum hydride which comprises reacting the corresponding alkali metal hydride or alkaline earth metal hydride with an aluminum halide in solution in diethyl ether, and bringing said product in contact with a tertiary amine selected from the group consisting of trimethylamine and triethylamine in an amount between about one and six per cent by weight of said product thereby stabilizing said product for storage.

2. The method for producing and stabilizing a product selected from the group consisting of an alkali metal aluminum hydride and an alkaline earth metal aluminum hydride which comprises reacting the corresponding alkali metal hydride or alkaline earth metal hydride with an aluminum halide in solution in diethyl ether, and bringing said product in contact with trimethylamine in an amount between about one and six per cent by weight of said product thereby stabilizing said product for storage.

3. The method for producing and stabilizing a product selected from the group consisting of an alkali metal aluminum hydride and an alkaline earth metal aluminum hydride which comprises reacting the corresponding alkali metal hydride or alkaline earth metal hydride with an aluminum halide in solution in diethyl ether, and bringing said product in contact with triethylamine in an amount between about one and six per cent by weight of said product thereby stabilizing said product for storage.

4. The method for producing and stabilizing lithium aluminum hydride which comprises reacting lithium hydride with an aluminum halide in solution in diethyl ether, and bringing the lithium aluminum hydride in contact with a tertiary amine selected from the group consisting of trimethylamine and triethylamine in an amount between about one and six per cent by weight of the lithium aluminum hydride thereby stabilizing the product for storage.

5. The method for producing and stabilizing a product selected from the group consisting of an alkali metal aluminum hydride and an alkaline earth metal aluminum hydride which comprises reacting the corresponding alkali metal hydride or alkaline earth metal hydride with an aluminum halide in solution in diethyl ether thereby forming a solution of said product containing a precipitate of a halide of an alkali metal or alkaline earth metal, removing said precipitate from the solution, adding to said solution a tertiary amine selected from the group consisting of trimethylamine and triethylamine in an amount between about one to six per cent by weight of said product, and thereafter concentrating said solution by evaporation.

No references cited.